United States Patent [19]
Curtis

[11] 3,767,541

[45] Oct. 23, 1973

[54] ANODIZED FILM FOR ELECTROLYTIC CAPACITOR AND METHOD FOR PREPARATION THEREOF

[75] Inventor: James H. Curtis, Cayce, S.C.

[73] Assignee: General Electric Company, Owensboro, Ky.

[22] Filed: June 29, 1971

[21] Appl. No.: 157,993

[52] U.S. Cl.................. 204/56 R, 204/58, 252/62.2
[51] Int. Cl...... C23b 9/02, C23b 11/02, H01g 9/02
[58] Field of Search............................ 204/56 R, 58; 252/62.2

[56] References Cited
UNITED STATES PATENTS
1,266,557   5/1918   Coulson................................ 204/58

OTHER PUBLICATIONS
The Surface Treatment and Finishing of Al., by Wernick et al., 1964, pgs. 365, 372–373.

Primary Examiner—Howard S. Williams
Assistant Examiner—R. L. Andrews
Attorney—Nathan J. Cornfeld et al.

[57] ABSTRACT

An anodized film is formed by oxidizing a metal selected from the group consisting of aluminum, niobium, tantalum, and titanium by forming the metal in a formation bath which consists essentially of ammonium hydroxide, sodium hydroxide, or potassium hydroxide; a polycarboxylic acid having from two to 10 carbon atoms; and an aqueous solvent. In the preferred embodiment, deionized water is used as the solvent. The formation electrolyte yields an oxide film or film-forming metals having enhanced capacitance or volt-microfarad product as compared to films formed using prior art formation electrolytes.

3 Claims, 1 Drawing Figure

PATENTED OCT 23 1973
3,767,541
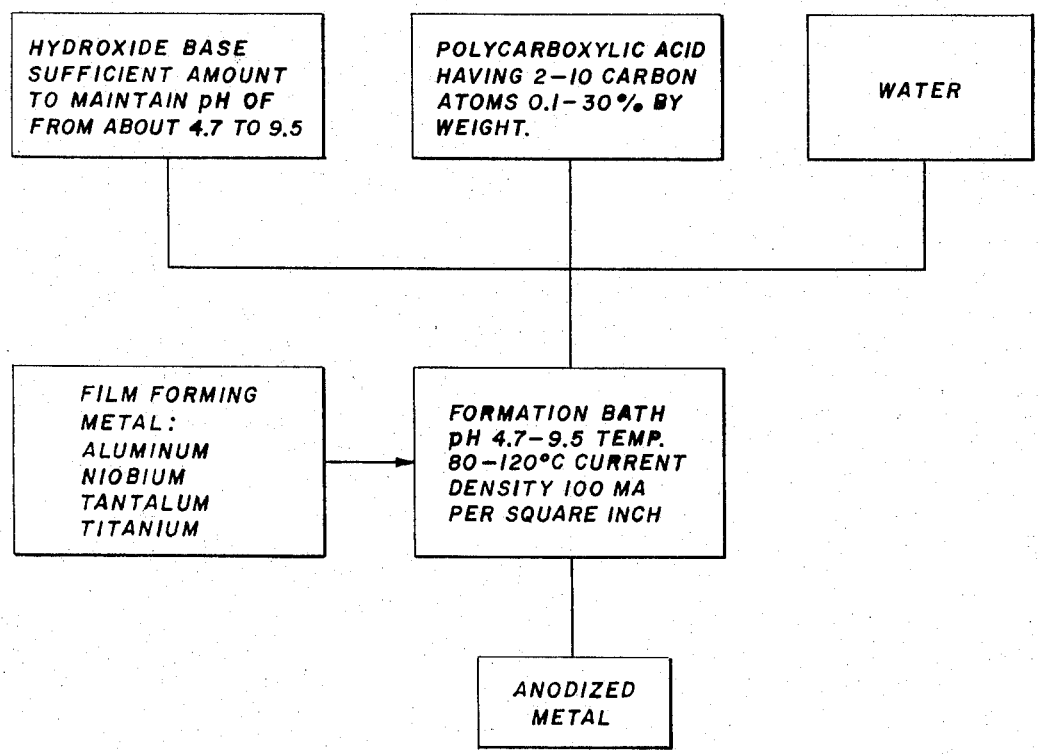
INVENTOR:
JAMES H. CURTIS,
BY John P. Taylor
HIS ATTORNEY.

ANODIZED FILM FOR ELECTROLYTIC CAPACITOR AND METHOD FOR PREPARATION THEREOF

BACKGROUND OF THE INVENTION

In the production of electrolytic capacitors, it is common to use one type of electrolyte for the formation or initial anodizing of the metal to form the metal oxide which will be the dielectric of the capacitor and another electrolyte in the subsequently fabricated device. The initial electrolyte, referred to as a formation electrolyte, is chosen on the basis of the quality of the resultant oxide film, the cost of the ingredients, and the compatibility of the so-formed oxide film with the fill electrolyte later to be used. The fill electrolyte, on the other hand, is chosen, among other things, for anti-corrosion characteristics which are not necessarily needed in the formation electrolyte.

Prior art, fill electrolytes have used both phosphate and boric acid additives to inhibit corrosion as well as to improve the scintillation voltage characteristics of the device. In many instances, the use of water in fill electrolytes is judiciously avoided because of the corrosion problems which can be encountered when water is present. Because of this prior art usage of phosphates and borates in fill electrolytes and the desire for compatibility, it is not surprising that the use of phosphate and boric acid in formation electrolytes is common. Quite surprisingly, I have discovered a formation electrolyte which utilizes water or a combination of water with other non-aqueous solents as a major constituent and which does not use any boric acid or phosphate compounds. The resultant film shows comparable and, in some instances, higher capacitance per square inch at a given formation voltage than prior art films formed using prior art formation electrolytes, yet is economical because of the large amounts of water used.

It is therefore an object of the invention to provide an aqueous formation electrolyte having improved film-forming properties. It is another object of the invention to form films having superior dielectric characteristics using aqueous formation electrolytes. It is yet another object of the invention to provide for the formation of anodized films using electrolytes which contain neither boric acids nor phosphates. These and other objects of the invention will become apparent from the description.

SUMMARY OF THE INVENTION

In accordance with the invention, an anodized film is electrolytically formed on a metal member selected from the group consisting aluminum, niobium, and tantalum in a formation bath consisting essentially of a base selected from the class consisting of sodium hydroxide, potassium hydroxide, and ammonium hydroxide; a polycarboxylic acid having two to 10 carbon atoms; and an aqueous solvent. In a preferred embodiment, the aqueous solvent comprises water.

BRIEF DESCRIPTION OF THE DRAWINGS

The sole FIGURE of the invention is a flow sheet.

DESCRIPTION OF THE PREFERRED EMBODIMENT

In accordance with the invention, an oxide film suitable for use as a dielectric is formed by anodizing the surface of a film-forming metal selected from the group consisting of aluminum, niobium, tantalum, and titanium. The oxide film of the invention is formed by anodizing the metal substrate in a formation bath consisting essentially of a hydroxide base; a polycarboxylic acid having two to 10 carbon atoms; and an aqueous solvent.

As stated above, the particular metals to which the invention is specifically addressed comprise the film-forming metals which, when anodized, are useful in the formation of electrolytic capacitors. These metals include aluminum, niobium, tantalum, and titanium.

The hydroxide base used in the invention preferably comprises a 28 percent by weight ammonium hydroxide commonly referred to as concentrated ammonium hydroxide. Sodium hydroxide or potassium hydroxide may, however, be used instead of ammonium hydroxide.

The polycarboxylic acids used in the invention are the polycarboxylic acids which are normally solid at room temperature and have from two to 10 carbon atoms. The fatty acids above 10 carbon acids have a rather high resistivity and therefore are not particularly useful in the practice of this invention. However, they may be useful where extremely high voltages is needed. Mono-carboxylic acids, on the other hand, do not give the improvement in capacitance found when using the polycarboxylic acids in accordance with the invention. In the preferred embodiment, the polycarboxylic acids comprise dicarboxylic acids having the following formula:

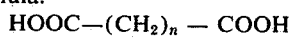

$HOOC-(CH_2)_n - COOH$ where n is an integer from 0–8.

The amount of the polycarboxylic acids used in the electrolyte range from about 0.001 percent by weight to about 30 percent by total weight of the elecdrolyte. Preferably the range is about 0.005 to about 5.0 percent. The range of pH of the electrolyte is from about 4.7 to about 9.5. Therefore, the amount of hydroxide used will be in proportion to the amount of acid so that the pH will lie within the aofrementioned boundaries. The remainder of the electrolyte comprises an aqueous solvent which preferably is deionized water. However, it is within the scope of the invention for other solvents, missible in water, to be used together with the water. Preferably, however, at least about two-thirds by weight of the solvent should comprise water. Other solvents which may be used with water include, for example, ethylene glycol, dimethyl formamide, diethylene glycol, and dimethylacetamide.

The temperature of the formation bath may vary considerably from about room temperature up to a point reasonably below the boiling point of the electrolyte. In the preferred embodiment, the temperature of the formation bath is maintained in a range of about 80–120°C.

The anodizing voltage used will, of course, vary with the desired thickness of oxide film as well as the desired working voltage. The voltage at which the metal is anodized is hereinafter referred to as effective forming voltage or EFV. While these voltages will vary depending upon the application, as is known to those skilled in the art, the particular formation electrolyte is most effective when forming dielectric films which are to withstand a voltage of from about 1–700 volts.

The films may be produced using batch type procedures in which the effective forming voltage is applied for a period of time until the current flow becomes stabilized indicating that the desired amount of oxide film has been formed. Alternatively, the formation electrolyte can be utilized in continuous processes wherein a continually unwinding roll of metallic foil is passed through a formation bath at a predetermined speed to provide the proper amount of formation time. These procedures are well known to those skilled in the art.

The following examples will further illustrate the practice of the invention.

EXAMPLE I

A number of formation solutions were made using varying amounts of ammonium hydroxide and adipic acid. The weight percent composition of the electrolytes used is listed in Table I below:

TABLE I

| Electrolyte No. | Water | Adipic acid | Percent ammonium hydroxide (conc.) | pH | Resistivity ohm—cm at 25 °C | Scintillation voltage 95 °C |
|---|---|---|---|---|---|---|
| 1 | 99.8 | 0.1 | 0.1 | 4.7 | 1355 | 265 |
| 2 | 99.5 | 0.25 | 0.25 | 4.35 | 1033 | 265 |
| 3 | 99.0 | 0.50 | 0.50 | 4.35 | 567 | 265 |
| 4 | 97.0 | 1.50 | 1.50 | 4.85 | 101 | 240 |
| 5 | 94.0 | 3.00 | 3.00 | 8.30 | 33 | 195 |
| 6 | 90.0 | 5.00 | 5.00 | 8.95 | 23 | 175 |

The formation electrolytes listed in Table I above were used to anodize 2 inch square aluminum anode foils at various formation voltages. The formation baths were maintained at a temperature of 95°C and a current density of 100 MA per square inch. Each sample was subjected to the formation voltage in the bath for a 5 minute period. The resulting capacitance in microfarads per square inch and the dissipation factor for each foil is tabulated below:

TABLE II

| Electrolyte Composition | EFV | Capacitance MFD/in$^2$ | Dissipation Factor % | V-MFD Product |
|---|---|---|---|---|
| 1 | 27.6 | 112.5 | 6.0 | 3105 |
|   | 87.8 | 28.0 | 3.2 | 2458 |
|   | 158.6 | 10.0 | 3.2 | 1586 |
| 2 | 7.0 | 395 | 17.3 | 2765 |
|   | 27.9 | 105 | 6.4 | 2930 |
|   | 88.8 | 28.3 | 3.2 | 2513 |
|   | 160.0 | 9.6 | 3.3 | 1536 |
| 3 | 7.3 | 395 | 18.0 | 2884 |
|   | 27.8 | 105 | 6.1 | 2919 |
|   | 89.5 | 28 | 3.5 | 2506 |
|   | 167.6 | 9.3 | 3.3 | 1559 |
| 4 | 7.2 | 393 | 18.3 | 2830 |
|   | 28.2 | 120 | 7.8 | 3384 |
|   | 89.6 | 30.8 | 3.6 | 2760 |
|   | 160 | 10 | 3.1 | 1600 |
| 5 | 7.6 | 370 | 15.8 | 2812 |
|   | 28.2 | 97 | 6.4 | 2735 |
|   | 89.6 | 31 | 3.1 | 2778 |
|   | 158.6 | 10.5 | 2.8 | 1665 |
| 6 | 7.3 | 375 | 16.4 | 2738 |
|   | 28.6 | 112 | 6.4 | 3203 |
|   | 89.2 | 31 | 3.2 | 2765 |
|   | 156.8 | 10.6 | 2.7 | 1662 |

EXAMPLE II

To further illustrate the practice of the invention, formation electrolytes were prepared in accordance with the invention using various polycarboxylic acids with an ammonium hydroxide base. Two prior art electrolytes comprising ammonium dihydrogen phosphate (ADP) and water were also prepared. The following table identifies the constituents of each electrolyte and the weight percent present. In each instance, the balance of the electrolyte was water.

TABLE III

| Electrolyte | ADP | ACID | BASE | pH |
|---|---|---|---|---|
| 7 | — | 0.5% Adipic | 0.5%NH$_4$OH | 7.5 |
| 8 | — | 0.5% Azelaic | 0.5%NH$_4$OH | 8.9 |
| 9 | — | 0.5% Sebacic | 0.5%NH$_4$OH | 8.8 |
| 10 | — | 0.014% Adipic | 0.014%NH$_4$OH | 5.7 |
| 11 | — | 0.009% Azelaic | 0.009%NH$_4$OH | 7.1 |
| 12 | — | 0.10% Sebacic | 0.10%NH$_4$OH | 9.2 |
| 13 | 0.0083% | — | — | 4.5 |
| 14 | 0.1% | — | — | 4.5 |

These electrolytes were used to anodize aluminum foil at various formation voltage and the capacitance per square inch of each was ascertained. In each instance, two samples were anodized and measured to minimize the possibility of spurious readings. The capacitance per square inch of the samples is tabulated below:

TABLE IV.—Electrolyte

| Voltage: | Capacitance mfd/in$^2$ | | | | | | | |
|---|---|---|---|---|---|---|---|---|
|  | 7 | 8 | 9 | 10 | 11 | 12 | 13 | 14 |
| 7 | 395 | 304 | 325 |  |  |  |  | 281 |
| 7 | 383 | 290 | 303 |  |  |  |  | 275 |
| 15 | 185 | 178 | 121 |  |  |  |  | 144 |
| 15 | 188 | 173 | 123 |  |  |  |  | 164 |
| 27 | 105 | 84 | 68 |  |  |  |  | 76 |
| 27 | 105 | 82 | 71 |  |  |  |  | 81 |
| 160 | 9.3 | 11.1 | 5.7 |  |  |  |  | 7.8 |
| 160 | 9.4 | 11.2 | 5.2 |  |  |  |  | 8.2 |
| 260 |  |  |  |  |  |  | 3.6 |  |
| 260 |  |  |  |  |  |  | 3.6 |  |
| 350 |  |  |  |  |  |  | 2.6 |  |
| 350 |  |  |  |  |  |  | 2.6 |  |
| 450 |  |  |  |  |  |  | 1.92 |  |
| 450 |  |  |  |  |  |  | 1.95 |  |
| 470 |  |  |  | 1.89 | 1.92 | 1.91 |  |  |
| 470 |  |  |  | 1.83 | 1.66 | 1.93 |  |  |
| 650 |  |  |  | 1.09 | 1.07 | 1.45 |  |  |
| 650 |  |  |  | 1.08 | 1.05 | 1.45 |  |  |

The results indicate satisfactory anodization occurs with various polycarboxylic acid and, in the compared range, the comparable performance of the formation electrolytes of the invention to a known prior art formation electrolyte.

EXAMPLE III

Formation electrolytes were prepared in accordance with the invention using potassium hydroxide and sodium hydroxide as the base and adipic acid as the polycarboxylic acid. An ammonium dihydrogen phosphate (ADP) electrolyte was also prepared for comparative purposes. The constituents of the electrolytes in weight percent are tabulated below:

TABLE V

| Electrolyte | Acid | Base | pH | Resistivity ohm–cm at 25 °C | Scintillation voltage 98 °C |
|---|---|---|---|---|---|
| 14 | 1.25% Adipic | 0.50% NaOH | 5.0 | 100 | 190 |
| 15 | 1.25% Adipic | 0.50% KOH | 5.0 | 100 | 190 |
| 16 | | 0.1% ADP | | | |

Sample foils of 5 inch square area 99.99 percent aluminum foil were anodized using the above electrolytes at 98°C using 500 milliamperes current at 190 EFV. The resulting capacitances in microfarads per square inch were as follows:

TABLE VI

| Electrolyte | Capacitance | Volt-Microfarad Product |
|---|---|---|
| 14 | 8.00 | 1520 |
| 15 | 8.14 | 1549 |
| 16 | 5.94 | 1129 |

The invention thus provides a formation electrolyte which yields an anodized foil having superior capacitance properties. The formation electrolyte composition is a relatively inexpensive material comprising mostly water yet is found to form an effective oxide film on the foil, particularly compatible when similar constituents, for example, polycarboxylic acids are used in the fill electrolyte, as, for example, described in Jenny and Curtis U.S. Pat. No. 3,547,423 issued Dec. 15, 1970 and assigned to the assignee of this invention.

What is claimed is:

1. For electrolytic capacitors, an anodized film on a metal member selected from the group consisting of aluminum, niobium, tantalum, and titanium electrolytically formed at a temperature of about 80–120°C in a formation bath consisting essentially of about 0.1–30 percent by weight of a saturated, aliphatic dicarboxylic acid selected from the group consisting of adipic, azelaic, and sebacic acids, a sufficient amount of ammonium hydroxide to maintain a pH of from about 4.7 to about 9.5, and an aqueous solvent.

2. In the manfuacture of electrodes for electrolytic capacitors, the process of forming an anodized film on aluminum which comprises electrolytically forming said film in a formation bath consisting essentially of sufficient alkali metal hydroxide to provide a pH of from about 4.7 to about 9.5, about 0.1–30 percent by weight of a dicarboxylic acid selected from the group consisting of adipic, azelaic, and sebacic acids, and the balance water at a temperature of about 80–120°C and a formation voltage of about 1–700 volts.

3. In the manufacture of electrodes for electrolytic capacitors, the process of forming anodized film on a metal member selected from the group consisting of aluminum, niobium, and tantalum which comprises electrolytically forming said film at a temperature of about 80–120°C in a formation bath consisting essentially of about 0.1–30 percent by weight of a saturated, aliphatic dicarboxylic acid selected from the group consisting of adipic, azelaic and sebacic acid, a sufficient amount of ammonium hydroxide to maintain a pH of from about 4.7 to about 9.5, and an aqueous solvent.

* * * * *